United States Patent
Lakhi et al.

(10) Patent No.: US 11,852,745 B2
(45) Date of Patent: Dec. 26, 2023

(54) SYSTEM AND METHOD TO SELECT AND DISPLAY PRIORITIZED AZIMUTH SLICE VERTICAL RADAR IMAGE

(71) Applicant: Rockwell Collins, Inc., Cedar Rapids, IA (US)

(72) Inventors: Divesh Lakhi, Cedar Rapids, IA (US); Mark Fersdahl, Cedar Rapids, IA (US); Venkata A. Sishtla, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 268 days.

(21) Appl. No.: 17/482,888

(22) Filed: Sep. 23, 2021

(65) Prior Publication Data

US 2023/0088985 A1  Mar. 23, 2023

(51) Int. Cl.
   *G01S 7/18*  (2006.01)
   *G01S 7/41*  (2006.01)
   (Continued)

(52) U.S. Cl.
   CPC ............... *G01S 7/18* (2013.01); *G01S 7/411* (2013.01); *G01S 13/95* (2013.01); *G06T 11/206* (2013.01);
   (Continued)

(58) Field of Classification Search
   CPC ......................................................... G01S 7/18
   (Continued)

(56) References Cited

U.S. PATENT DOCUMENTS

| 4,829,308 A | * | 5/1989 | Tol | ........................ G01S 7/298 |
|---|---|---|---|---|
| | | | | 342/185 |
| 5,680,138 A | * | 10/1997 | Pritt | .................... G01S 13/9027 |
| | | | | 342/25 A |

(Continued)

FOREIGN PATENT DOCUMENTS

| EP | 0964381 A2 | 12/1999 |
|---|---|---|
| EP | 2216660 A3 | 8/2013 |

(Continued)

OTHER PUBLICATIONS

Extended European Search Report dated Jan. 19, 2023 on European Application No. 22197545.1.

*Primary Examiner* — Reza Nabi
(74) *Attorney, Agent, or Firm* — Suiter Swantz pc llo (57) ABSTRACT

A system may include a display and a processor. The processor may be configured to: break down two-dimensional weather radar reflectivity data into cells, each cell of the cells having a maximum rainfall rate location and a geometric area; prioritize the cells based at least on each cell's proximity to the aircraft, each cell's intensity, each cell's growth rate, each cell's storm top altitude relative to the aircraft altitude, and/or a threat convective level of the cell to select a highest priority cell; and output, to the display, a highest priority azimuth slice vertical radar image of the two-dimensional weather radar reflectivity data as graphical data, the highest priority azimuth slice vertical radar image corresponding to an azimuth slice of the two-dimensional weather radar reflectivity data for the highest priority cell. The display may be configured to display the highest priority azimuth slice vertical radar image.

15 Claims, 8 Drawing Sheets

(51) Int. Cl.
  *G01S 13/95* (2006.01)
  *G06T 11/20* (2006.01)
  *G06F 3/04842* (2022.01)

(52) U.S. Cl.
  CPC ...... *G06F 3/04842* (2013.01); *G06T 2200/24* (2013.01)

(58) Field of Classification Search
  USPC .......................................................... 342/26
  See application file for complete search history.

(56) References Cited

U.S. PATENT DOCUMENTS

| | | | | |
|---|---|---|---|---|
| 6,879,280 | B1* | 4/2005 | Bull | G01S 13/953 342/182 |
| 7,109,913 | B1* | 9/2006 | Paramore | G01S 13/953 342/182 |
| 7,242,343 | B1* | 7/2007 | Woodell | G01S 7/41 342/26 B |
| 7,696,921 | B1* | 4/2010 | Finley | G01S 7/24 342/26 B |
| 7,868,811 | B1* | 1/2011 | Woodell | G01S 13/953 342/182 |
| 8,050,864 | B2* | 11/2011 | Schilke | G01C 23/00 701/14 |
| 8,159,369 | B1* | 4/2012 | Koenigs | G01S 13/953 340/963 |
| 8,786,486 | B1* | 7/2014 | Sperling | G01S 7/22 342/26 B |
| 9,019,147 | B1* | 4/2015 | Oranskiy | G01S 7/14 342/26 R |
| 9,134,418 | B1* | 9/2015 | Kronfeld | G01S 7/412 |
| 9,244,167 | B1* | 1/2016 | Oransky | G01S 13/87 |
| 9,524,571 | B2* | 12/2016 | Coulmeau | G08G 5/0034 |
| 9,535,158 | B1* | 1/2017 | Breiholz | G01S 7/04 |
| 9,612,328 | B1* | 4/2017 | Breiholz | G01S 7/062 |
| 9,710,218 | B2* | 7/2017 | Khatwa | G01S 7/24 |
| 9,823,347 | B1* | 11/2017 | Koenigs | G01S 7/22 |
| 9,869,766 | B1* | 1/2018 | Breiholz | G01S 13/106 |
| 10,037,124 | B2* | 7/2018 | Khatwa | G08G 5/0052 |
| 10,417,916 | B2* | 9/2019 | Bhuyar | G01C 23/00 |
| 10,571,575 | B2* | 2/2020 | Schultz | G06T 7/521 |
| 11,080,526 | B2* | 8/2021 | Khandelwal | G06V 20/182 |
| 11,249,185 | B2* | 2/2022 | Kawanami | G01S 7/2926 |
| 11,630,198 | B2* | 4/2023 | Rivers | G01S 13/867 342/179 |
| 2003/0006928 | A1* | 1/2003 | Szeto | G01S 7/18 342/26 B |
| 2009/0177343 | A1* | 7/2009 | Bunch | G01S 7/22 701/14 |
| 2011/0148694 | A1* | 6/2011 | Bunch | G01W 1/10 342/26 B |
| 2016/0041305 | A1* | 2/2016 | Stulken | G01C 23/00 340/977 |
| 2018/0149745 | A1* | 5/2018 | Christianson | G01S 7/062 |
| 2018/0354506 | A1* | 12/2018 | Minemura | G01S 13/867 |
| 2020/0018848 | A1* | 1/2020 | Rivers | G01S 7/16 |
| 2022/0018956 | A1* | 1/2022 | Jung | G01S 7/2883 |
| 2022/0065983 | A1* | 3/2022 | Ruzanski | G01S 7/023 |
| 2023/0088985 | A1* | 3/2023 | Lakhi | G08G 5/0091 |
| 2023/0131160 | A1* | 4/2023 | Davalos | G01S 13/426 342/26 B |

FOREIGN PATENT DOCUMENTS

| | | |
|---|---|---|
| EP | 2966408 A1 | 1/2016 |
| EP | 2461177 B1 | 6/2017 |
| EP | 3748399 A1 | 12/2020 |

* cited by examiner

SYSTEM AND METHOD TO SELECT AND DISPLAY PRIORITIZED AZIMUTH SLICE VERTICAL RADAR IMAGE

BACKGROUND

Currently, radar display interfaces require a pilot to select a slice of weather to display on a vertical situation display (VSD). Currently, pilots spend significant amounts of time trying to determine which vertical slices of weather are important in relation to the piloted aircraft, and such time could be spent by the pilot on other flight tasks or to improve situational awareness. Additionally, such pilot selection of vertical slices of weather requires frequent updating as the importance of vertical slices of weather can change during the course of a flight. Additionally, such pilot selection of vertical slices of weather is prone to pilot error, especially when pilots are trying to complete other time-sensitive tasks.

SUMMARY

In one aspect, embodiments of the inventive concepts disclosed herein are directed to a system. The system may include a display and at least one processor communicatively coupled to the display. The at least one processor may be configured to: obtain aircraft data associated with an aircraft, the aircraft data including information of an aircraft position of the aircraft and an aircraft altitude of the aircraft; obtain or generate two-dimensional weather radar reflectivity data for a region proximate to the aircraft position, the two-dimensional weather radar reflectivity data including or based on at least one of horizontal weather radar scans or vertical weather radar scans; break down the two-dimensional weather radar reflectivity data into cells, each cell of the cells having a maximum rainfall rate location and a geometric area; compute storm top information of a given cell and information of a growth rate of the given cell for each cell of the cells from the two-dimensional weather radar reflectivity data; prioritize the cells based at least on at least one of each cell's proximity to the aircraft, each cell's intensity, each cell's growth rate, each cell's storm top altitude relative to the aircraft altitude, or a threat convective level of the cell to select a highest priority cell; and output, to the display, a highest priority azimuth slice vertical radar image of the two-dimensional weather radar reflectivity data as graphical data, the highest priority azimuth slice vertical radar image corresponding to an azimuth slice of the two-dimensional weather radar reflectivity data for the highest priority cell. The display may be configured to display the highest priority azimuth slice vertical radar image to a user.

In a further aspect, embodiments of the inventive concepts disclosed herein are directed to a method. The method may include: obtaining, by at least one processor communicatively coupled to a display, aircraft data associated with an aircraft, the aircraft data including information of an aircraft position of the aircraft and an aircraft altitude of the aircraft; obtaining or generating, by the at least one processor, two-dimensional weather radar reflectivity data for a region proximate to the aircraft position, the two-dimensional weather radar reflectivity data including or based on at least one of horizontal weather radar scans or vertical weather radar scans; breaking down, by the at least one processor, the two-dimensional weather radar reflectivity data into cells, each cell of the cells having a maximum rainfall rate location and a geometric area; computing, by the at least one processor, storm top information of a given cell and information of a growth rate of the given cell for each cell of the cells from the two-dimensional weather radar reflectivity data; prioritizing, by the at least one processor, the cells based at least on at least one of each cell's proximity to the aircraft, each cell's intensity, each cell's growth rate, each cell's storm top altitude relative to the aircraft altitude, or a threat convective level of the cell to select a highest priority cell; outputting, by the at least one processor to the display, a highest priority azimuth slice vertical radar image of the two-dimensional weather radar reflectivity data as graphical data, the highest priority azimuth slice vertical radar image corresponding to an azimuth slice of the two-dimensional weather radar reflectivity data for the highest priority cell; and displaying, by the display, the highest priority azimuth slice vertical radar image to a user.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system (e.g., an aircraft system) and a method configured to select and display a prioritized (e.g., a highest priority) azimuth slice vertical radar image of a two-dimensional weather radar reflectivity data.

Currently, radar display interfaces require a pilot-commanded input to select a slice of weather to display on a vertical situation display (VSD). At present, algorithms exist in the radar that break up the weather contents on a horizontal display into individual cells based on their hazardous regions. The radar may then use these cells to generate the vertical slice based on the pilot input. This pilot input can increase the flight crew's workload, especially during critical flight phases.

Some embodiments may autonomously select a highest priority (e.g., a most hazardous) slice of weather to be displayed by the VSD. This may let the pilot focus on other high-priority tasks while displaying an optimal VSD. Some embodiments may include autonomously selecting and prioritizing the vertical slices based at least on a weather cell's intensity, distance, and/or growth rate. In addition to the automatic selection of the vertical slice, an automatic display pop-up mode can be used to ensure the display is provided to the pilot. If the VSD mode is turned off, the pop-up may force the weather information to be displayed. The pop-up may occur when the vertical slice indicates a threat to the flight plan based on the aforementioned parameters and/or other weather threat decisions.

Some embodiments may utilize detected reflectivity at a given range and azimuth, and then use such information to drive the autonomous VSD selection. For example, if (a) rainfall rate at a given azimuth and a given range is greater than a predetermined rainfall rate threshold, (b) the given range is less than a predetermined range threshold, and (c) an absolute value of the given azimuth is less than a predetermined azimuth threshold, then system may determine that the given azimuth is the highest priority azimuth, and the VSD may display an azimuth slice vertical radar image corresponding to the highest priority azimuth.

Some embodiments may include an autonomous VSD selection suitable for single-piloted aircraft, which may reduce pilot workload and help prevent human error. Present solutions require the pilot to use a dial/knob to select a cell of interest. Furthermore, some embodiments may prevent a need for pilots to fine-tune a location of a weather cell to pick a most hazardous region. Some embodiments allow the VSD to autonomously display a highest priority azimuth slice vertical radar image while reducing crew workload.

In some embodiments, on system power-up, a VSD may, by default, display an azimuth slice on an aircraft's track angle.

In some embodiments, a VSD may have multiple modes such as, weather radar (e.g., vertical weather radar with prioritized cell selections), terrain, air traffic, and/or off. In some embodiments, if the selected VSD mode is anything other than vertical weather radar with prioritized cell selections, and if the radar determines a highest priority azimuth slice vertical radar image is along a flight plan, within specified distance, and/or is considered severe, the radar can command the display to activate or override the selected mode to vertical weather radar with prioritized cell selections so as to display the highest priority azimuth slice vertical radar image.

Figure 1:
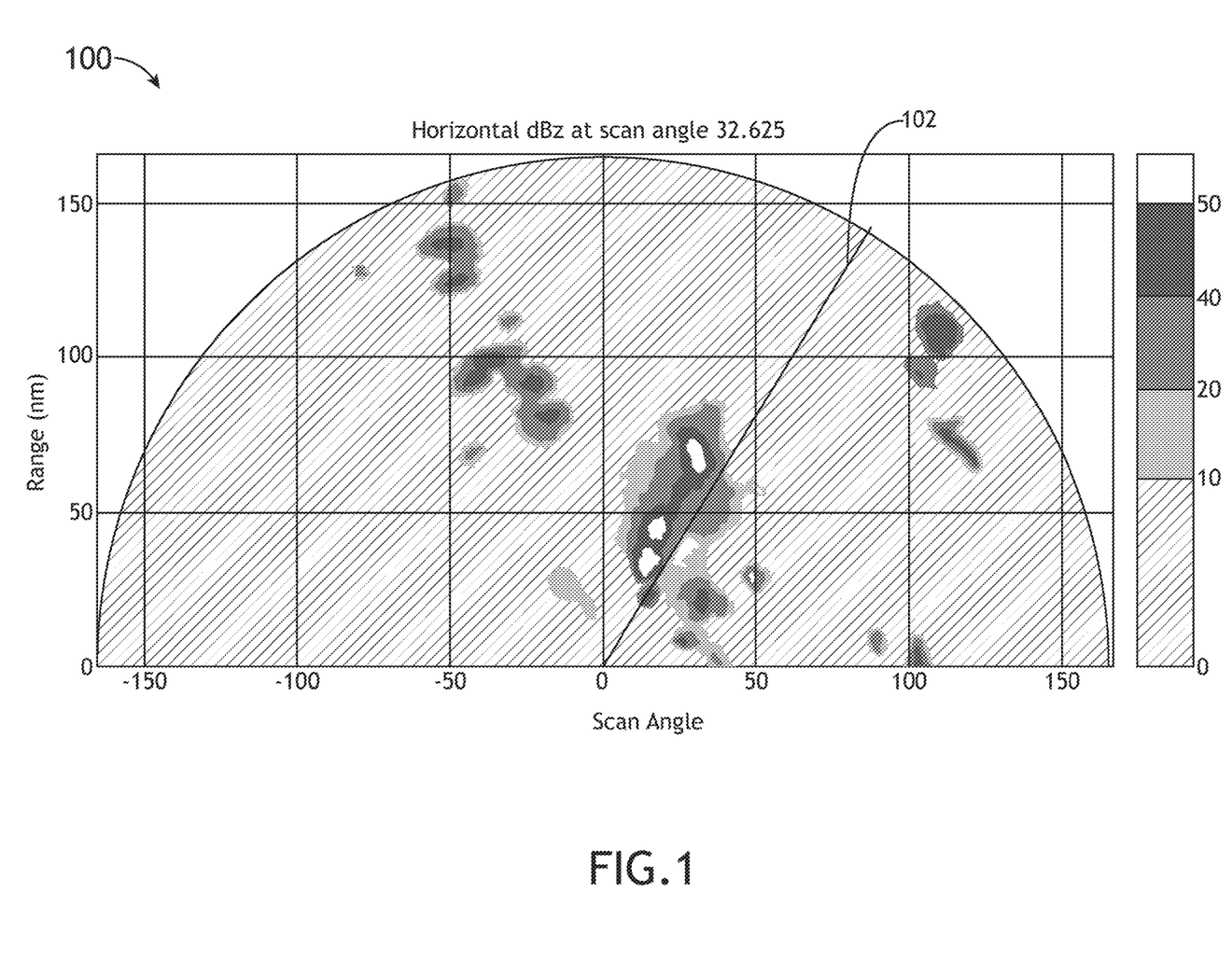
FIG. 1 is a view of an exemplary embodiment of a horizontal weather display image according to the inventive concepts disclosed herein.
Figure 2:
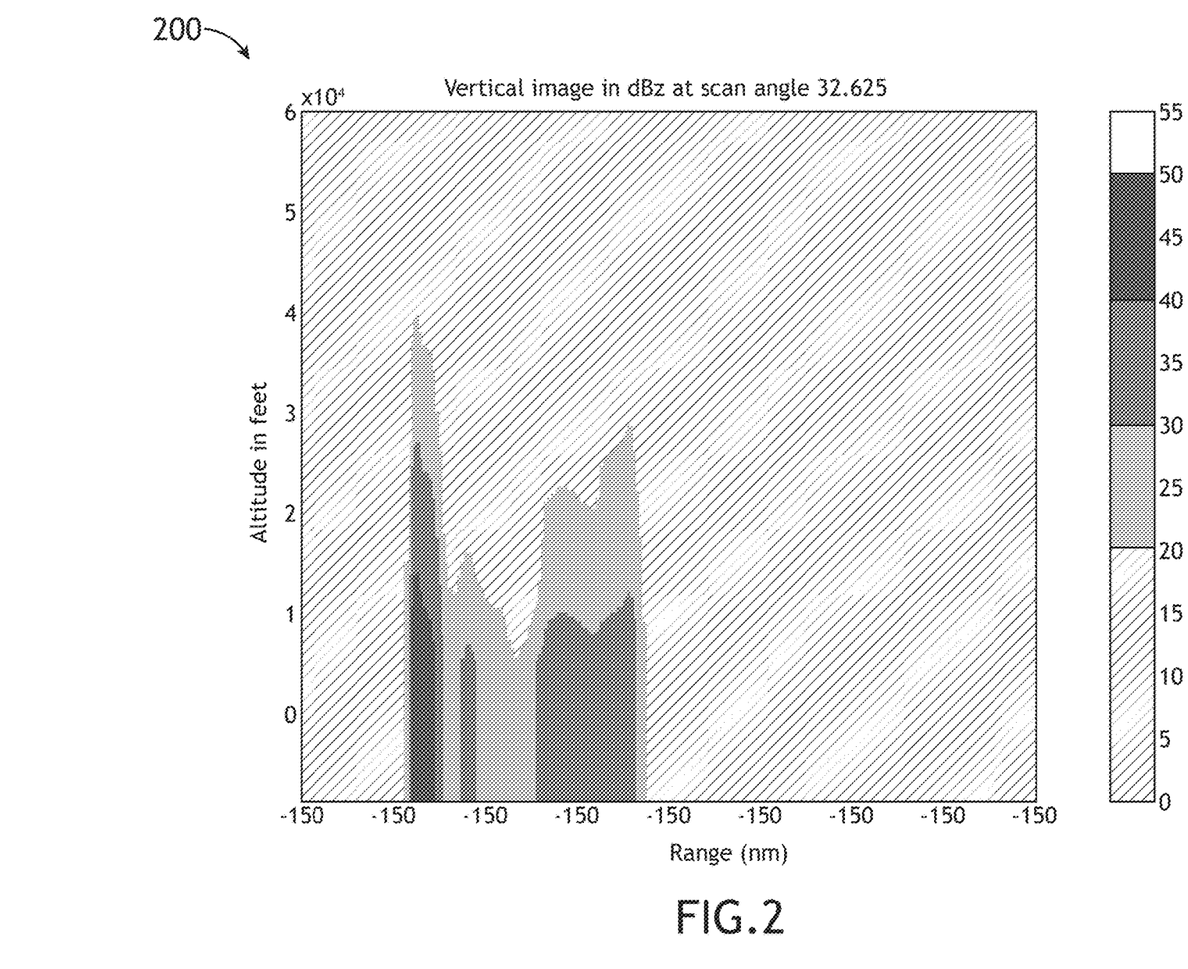
FIG. 2 is a view of an exemplary embodiment of a highest priority azimuth slice vertical radar image according to the inventive concepts disclosed herein.

Referring generally to FIGS. 1-2, exemplary embodiments of a view of an exemplary horizontal weather radar image 100 and a view of an exemplary azimuth slice vertical radar image (e.g., a highest priority azimuth slice vertical radar image 200) are shown. For example, the horizontal weather radar image 100 may convey a rainfall rate (dBz) over a range (e.g., in nautical miles (nm)) dimension and a weather radar scan angle dimension; for example, as shown the a scan angle line 102 is shown corresponding to a scan angle of 32.625 degrees of the highest priority azimuth slice vertical radar image 200. For example, the highest priority azimuth slice vertical radar image 200 may convey a rainfall rate (dBz) along the scan angle of 32.625 degrees over a range (e.g., in nautical miles (nm)) dimension and an aircraft altitude dimension. For example, a display may be configured to switch between displaying the horizontal weather radar image(s) 100, the azimuth slice vertical radar image(s) (e.g., a highest priority azimuth slice vertical radar image(s) 200), and/or other graphical information based on a user input (e.g., a weather radar mode selection) or an overriding radar processor determination.

Referring now to FIGS. 3-6, an exemplary embodiment of a system 300 according to the inventive concepts disclosed herein is depicted. In some embodiments, the system may include at least one offboard source 312 and/or an aircraft 302, which may include at least one user (e.g., flight crew and/or pilot(s)), at least one display unit computing device 304, at least one aircraft computing device 306, at least one radar computing device 308, and/or at least one user interface 310, some or all of which may be communicatively coupled at any given time. In some embodiments, the at least one display unit computing device 304, the at least one aircraft computing device 306, the at least one radar computing device 308, and/or the at least one user interface 310 may be implemented as a single computing device or any number of computing devices configured to perform (e.g., collectively perform if more than one computing device) any or all of the operations disclosed throughout. For example, the at least one display unit computing device 304, the at least one aircraft computing device 306, the at least one radar computing device 308, and/or the at least one user interface 310 may be installed in the aircraft 302. In some embodiments, the at least one display unit computing device 304, the at least one aircraft computing device 306, the at least one radar computing device 308, the at least one user interface 310, and/or a user (e.g., a remote pilot or remote crewmember) may be located offboard of the aircraft 302, for example, if a given aircraft 302 is a remote piloted aircraft (e.g., an unmanned aerial vehicle (UAV) or a drone aircraft).

Figure 3:
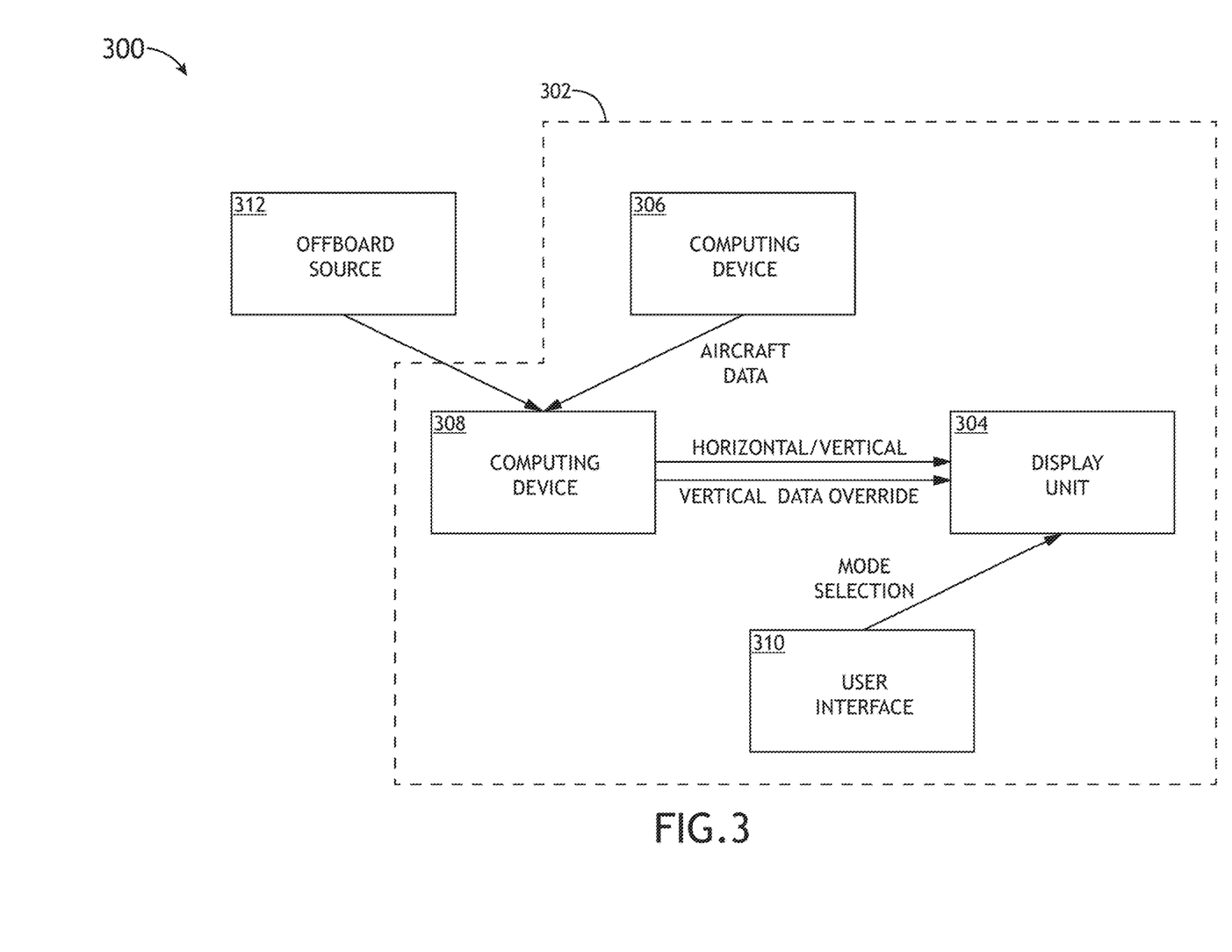
FIG. 3 is a view of an exemplary embodiment of a system according to the inventive concepts disclosed herein.

For example, the user may be a pilot or crew member. The user may interface with the system 300 via the at least one user interface 310. The at least one user interface 310 may be implemented as any suitable user interface, such as a control panel, a touchscreen (e.g., of the display unit computing device 304 and/or another display unit), a multipurpose control panel, a control panel integrated into a flight deck, a cursor control panel (CCP) (sometimes referred to as a display control panel (DCP)), a keyboard, a mouse, a trackpad, at least one hardware button, a switch, an eye tracking system, and/or a voice recognition system. The user interface 310 may be configured to receive at least one user input and to output the at least one user input to a computing device (e.g., 304, 306, and/or 308). For example, a pilot of the aircraft 302 may be able to interface with the user interface 310 to: make a user selection (e.g., a weather radar mode selection) indicating whether to display a horizontal weather radar image 100 and/or a highest priority azimuth slice vertical radar image 200. For example, the weather radar mode selection may indicate to display either or both of the horizontal weather radar image 100 and/or the highest priority azimuth slice vertical radar image 200. For example, such user inputs may be output to the radar computing device 308 and/or the display unit computing device 304.

Figure 4A:
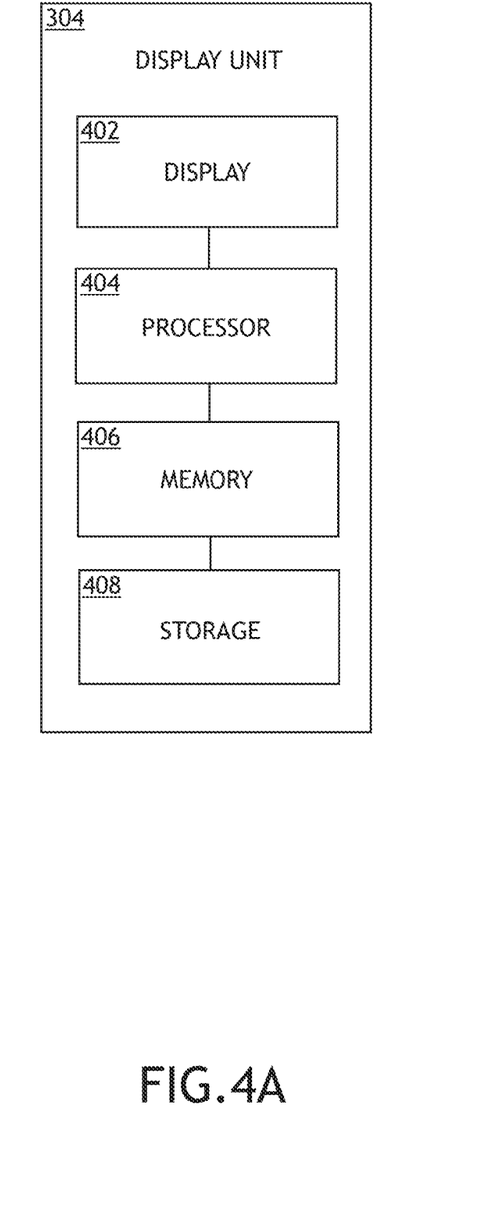
FIG. 4A is a view of a first exemplary embodiment of a display unit computing device of the system of FIG. 3 according to the inventive concepts disclosed herein.
Figure 4B:
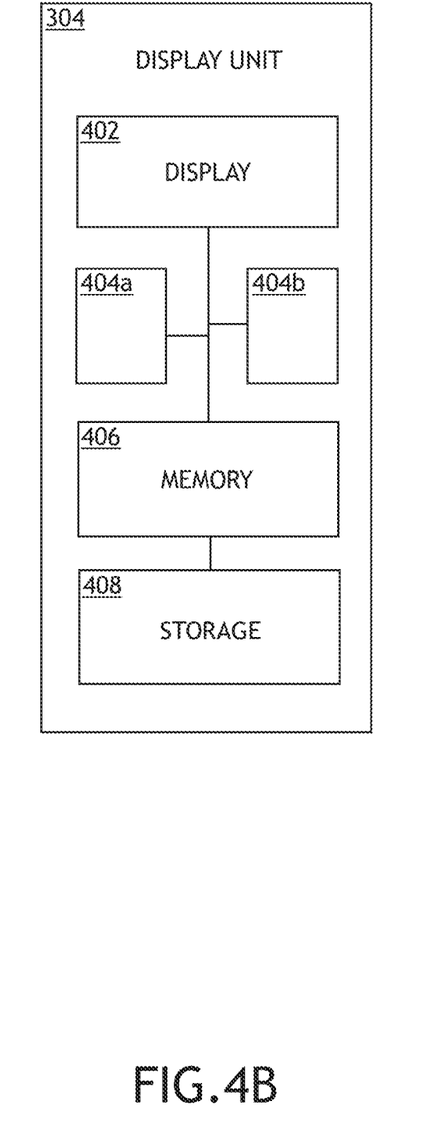
FIG. 4B is a view of a second exemplary embodiment of a display unit computing device of the system of FIG. 3 according to the inventive concepts disclosed herein.

The display unit computing device 304 may be implemented as any suitable computing device, such as a primary flight display (PFD) computing device, a weather radar display computing device (e.g., a VSD computing device), and/or a multi-function window (MFW) display computing device. As shown in FIGS. 4A and 4B, the display unit computing device 304 may include at least one display 402, at least one processor 404 (e.g., at least one horizontal display processor 404A and/or at least one vertical display processor 404B), at least one memory 406, and/or at least one storage 410, some or all of which may be communicatively coupled at any given time. For example, the at least one processor 404 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 404 may include a CPU and a GPU configured to perform (e.g., collectively perform) any of the operations disclosed throughout. The processor 404 may be configured to run various software applications (e.g., a weather radar display application, a PFD application, and/or an MFW application) or computer code stored (e.g., maintained) in a non-transitory computer-readable medium (e.g., memory 406 and/or storage 410) and configured to execute various instructions or operations. The processor 404 may be configured to perform any or all of the operations disclosed throughout. For example, the processor 404 may be configured to: receive at least one a horizontal weather radar image 100 as graphical data (e.g., from the radar computing device 308) and/or at least one highest priority azimuth slice vertical radar image 200 (e.g., from the radar computing device 308). The display 402 may be configured to display one or both of the at least one a horizontal weather radar image 100 or the at least one at least one highest priority azimuth slice vertical radar image 200, as well as other information.

Figure 5:
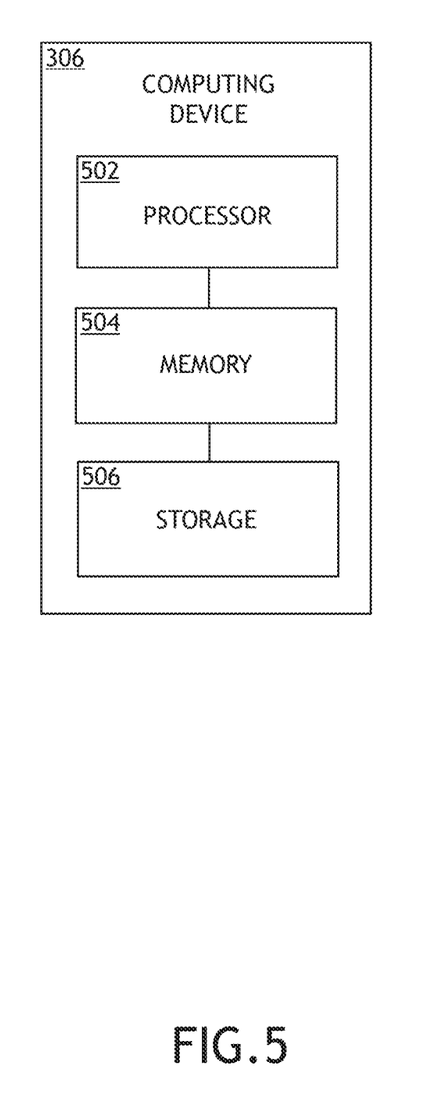
FIG. 5 is a view of an exemplary embodiment of an aircraft computing device of the system of FIG. 3 according to the inventive concepts disclosed herein.

The at least one aircraft computing device 306 may be implemented as any suitable computing device, such as a flight management system (FMS) computing device, a flight data computer, an inertial reference unit (IRU), or a global positioning system (GPS) device. The at least one aircraft computing device 306 may include any or all of the elements, as shown in FIG. 5. For example, the aircraft computing device 306 may include at least one processor 502, at least one memory 504, and/or at least one storage 506, some or all of which may be communicatively coupled at any given time. For example, the at least one processor 502 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 502 may include a CPU and a GPU configured to perform (e.g., collectively perform) any of the operations disclosed throughout. The processor 502 may be configured to run various software applications (e.g., an FMS application, a flight data computer application, an IRU application, and/or a GPS application) or computer code stored (e.g., maintained) in a non-transitory computer-readable medium (e.g., memory 504 and/or storage 506) and configured to execute various instructions or operations. The processor 502 of the aircraft computing device 306 may be configured to perform any or all of the operations disclosed throughout. For example, the processor 502 of the computing device 210A may be configured to: output aircraft data (e.g., information of altitude of the aircraft 302, information of a position of the aircraft 302, information of a flight plan, information of an air temperature outside of the aircraft 302, FMS data, flight path data, GPS data, inertial reference unit (IRU) data, flight data, and/or flight computer data) to the display unit computing device 304 and/or the radar computing device 308.

The at least one radar computing device 308 may be implemented as any suitable computing device, such as a weather radar computing device. The at least one radar computing device 308 may include any or all of the elements shown in FIG. 6. For example, the radar computing device 308 may include at least one radar antenna 601, at least one processor 602, at least one memory 604, and/or at least one storage 606, some or all of which may be communicatively coupled at any given time. For example, the at least one processor 602 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 602 may include a CPU and a GPU configured to perform (e.g., collectively perform) any of the operations disclosed throughout. The processor 602 may be configured to run various software applications (e.g., a radar application) or computer code stored (e.g., maintained) in a non-transitory computer-readable medium (e.g., memory 604 and/or storage 606) and configured to execute various instructions or operations. The processor 602 of the radar computing device 308 may be configured to perform any or all of the operations disclosed throughout. For example, the processor 602 may be configured to: obtain (e.g., from the aircraft computing device 306) aircraft data associated with an aircraft 302, wherein the aircraft data may include information of an aircraft position of the aircraft 302, an aircraft altitude of the aircraft 302, and/or a flight plan of the aircraft 302; obtain (e.g., from the offboard source 312 (e.g., a satellite(s) and/or a ground radar system(s))) or generate two-dimensional weather radar reflectivity data for a region proximate to the aircraft position, wherein the two-dimensional weather radar reflectivity data may include and/or be based on at least one of horizontal weather radar scans or vertical weather radar scans; break down the two-dimensional weather radar reflectivity data into cells (e.g., utilize image processing to break down the two-dimensional weather radar reflectivity data into cells), wherein each cell of the cells may have a maximum rainfall rate location and a geometric area; compute storm top information of a given cell and information of a growth rate of the given cell for each cell of the cells from the two-dimensional weather radar reflectivity data; prioritize the cells based at least on at least one of each cell's proximity to the aircraft, each cell's intensity, each cell's growth rate, each cell's storm top altitude relative to the aircraft altitude, or a threat convective level of the cell to select a highest priority cell; and/or output, to the display unit computing device 304, a highest priority azimuth slice vertical radar image 200 of the two-dimensional weather radar reflectivity data as graphical data, wherein the highest priority azimuth slice vertical radar image 200 may correspond to an azimuth slice of the two-dimensional weather radar reflectivity data for the highest priority cell.

As used throughout, cell intensity may refer to a measurement of the reflectivity within the cell. For example, cell intensity may simply be the maximum reflectivity measured within the cell. However, cell intensity may also be measured in other ways, such as the area of a measured reflectivity within the cell (e.g., the area of 40 dBz within the cell boundaries).

As used throughout, cell growth rate may refer to the growth in altitude of a reference reflectivity level within the cell (e.g., usually 18 to 20 dBz). Cell growth rate is usually measured in feet per minute.

As used throughout, convective level may refer to a measurement of convectiveness. A measurement of convectiveness may be done in multiple ways. For example, an index for convective levels may be based on echo top, max reflectivity, reflectivity areas, gradient of reflectivity within the cell, and/or lightning rate.

Figure 6:
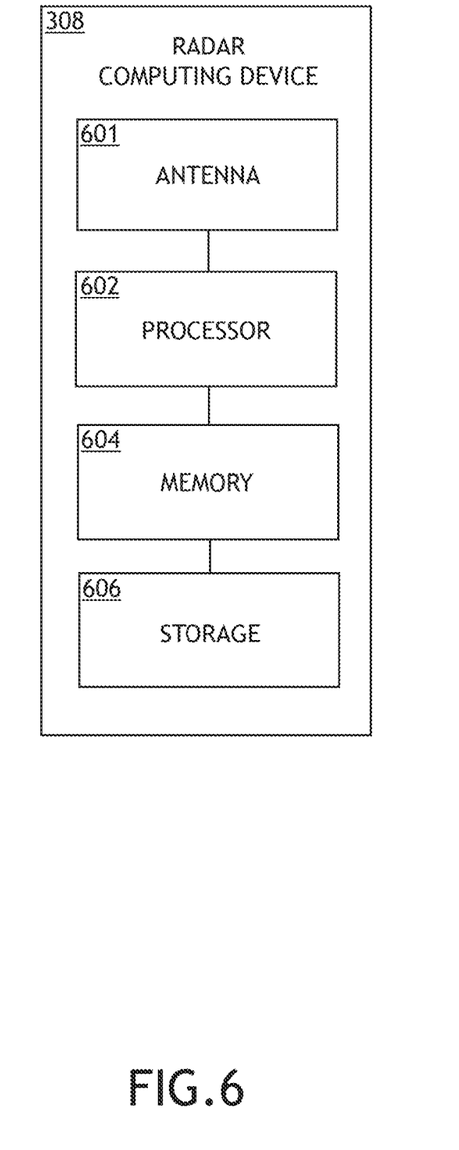
FIG. 6 is a view of an exemplary embodiment of a radar computing device of the system of FIG. 3 according to the inventive concepts disclosed herein.

Additionally, for example, the processor 602 may be further configured to: prioritize the cells based at least on the at least one of each cell's proximity to the aircraft, each cell's intensity, each cell's growth rate, each cell's storm top altitude relative to the aircraft altitude, or the threat convective level of the cell to select, using hysteresis, the highest priority cell to ensure that a selection of the highest priority cell does not change for at least a predetermined amount of time (e.g., 10 seconds, 30 seconds, 1 minute, 5 minutes, or more). For example, using such hysteresis may prevent rapid changes in determined highest priority cells that might make it difficult for a pilot to focus on a single highest priority azimuth slice vertical radar image 200 at a given time.

For example, at least one processor (e.g., the at least one processor 404 (e.g., the at least one processor 404A and/or the at least one processor 404B), the at least one processor 502, and/or the at least one processor 602) may be configured to (e.g., collectively configured to, if more than one processor): obtain aircraft data associated with an aircraft 302, the aircraft data including information of an aircraft position of the aircraft 302 and an aircraft altitude of the aircraft; obtain or generate two-dimensional weather radar reflectivity data for a region proximate to the aircraft position, the two-dimensional weather radar reflectivity data including or based on at least one of horizontal weather radar scans or vertical weather radar scans; break down the two-dimensional weather radar reflectivity data into cells (e.g., utilize image processing to break down the two-dimensional weather radar reflectivity data into cells), each cell of the cells having a maximum rainfall rate location and a geometric area; compute storm top information of a given cell and information of a growth rate of the given cell for each cell of the cells from the two-dimensional weather radar reflectivity data; prioritize the cells based at least on at least one of each cell's proximity to the aircraft, each cell's intensity, each cell's growth rate, each cell's storm top altitude relative to the aircraft altitude, or a threat convective level of the cell to select a highest priority cell; and/or output, to the display 402 and/or the display unit computing device 304, a highest priority azimuth slice vertical radar image 200 of the two-dimensional weather radar reflectivity data as graphical data, the highest priority azimuth slice vertical radar image 200 corresponding to an azimuth slice of the two-dimensional weather radar reflectivity data for the highest priority cell.

In some embodiments, the at least one processor (e.g., the at least one processor 404 (e.g., the at least one processor 404A and/or the at least one processor 404B), the at least one processor 502, and/or the at least one processor 602) may include at least one display unit computing device processor 404 (e.g., the at least one processor 404A and/or the at least one processor 404B) and at least one radar computing device processor 602, the at least one display unit computing device processor 404 and the at least one radar computing device processor 602 being communicatively coupled, wherein one or more of the at least one processor (e.g., the at least one processor 404 (e.g., the at least one processor 404A and/or the at least one processor 404B), and/or the at least one processor 602) is configured to obtain the aircraft data from at least one aircraft computing device 306. In some embodiments, the at least one display unit computing device processor 404 may comprise at least one horizontal display processor 404A and at least one vertical display processor 404B, wherein one or more of the at least one processor (e.g., the at least one processor 404 (e.g., the at least one processor 404A and/or the at least one processor 404B), and/or the at least one processor 602) is configured to receive a user selection to display a horizontal weather radar image 100 and/or the highest priority azimuth slice vertical radar image 200. For example, if the user selection is for the horizontal weather radar image 100, the at least one horizontal display processor 404A may be configured to display the horizontal weather radar image 100. For example, if the user selection is for the highest priority azimuth slice vertical radar image 200, the at least one vertical display processor 404B may be configured to display the highest priority azimuth slice vertical radar image 200. In some embodiments, where the user selection is for anything other than the highest priority azimuth slice vertical radar image 200, the at least one radar computing device processor 602 may be configured to: determine that the highest priority azimuth slice vertical radar image 100 is severe based at least on at least one of the highest priority cell being along a flight plan and/or the highest priority cell being within a predetermined distance of the flight plan and/or of the aircraft position; and/or override the user selection to cause the at least one vertical display processor 404B to output the highest priority azimuth slice vertical radar image 200 to the display 402.

At least one processor (e.g., the at least one processor 404 (e.g., the at least one processor 404A and/or the at least one processor 404B), the at least one processor 502, and/or the at least one processor 602) of the aircraft 302 may be configured to perform (e.g., collectively perform) any or all of the operations disclosed throughout.

Figure 7:
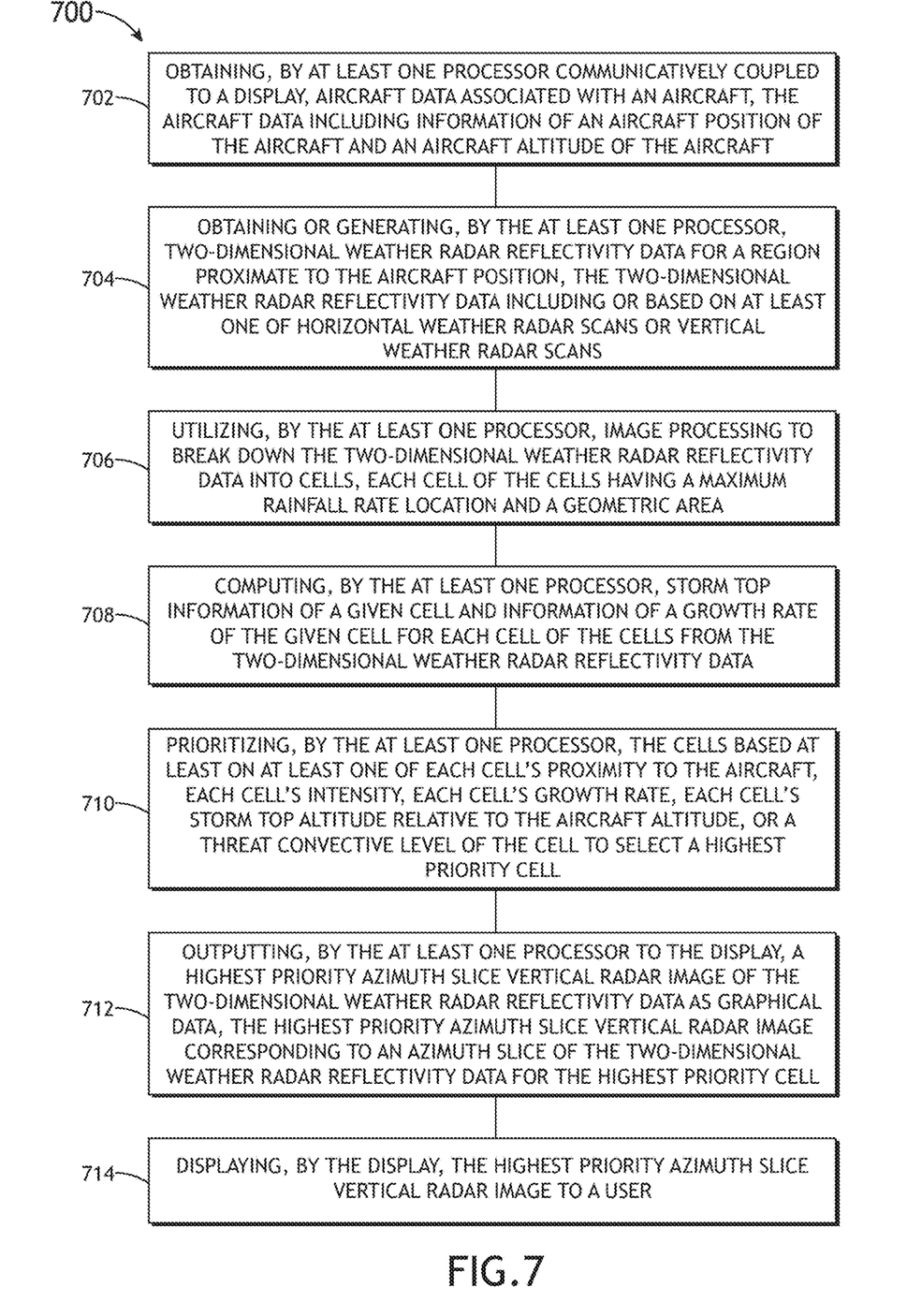
FIG. 7 is a diagram of an exemplary embodiment of a method according to the inventive concepts disclosed herein.

Referring now to FIG. 7, an exemplary embodiment of a method 700 according to the inventive concepts disclosed herein may include one or more of the following steps. Additionally, for example, some embodiments may include performing one or more instances of the method 700 iteratively, concurrently, and/or sequentially. Additionally, for example, at least some of the steps of the method 700 may be performed in parallel and/or concurrently. Additionally, in some embodiments, at least some of the steps of the method 700 may be performed non-sequentially.

A step 702 may include obtaining, by at least one processor communicatively coupled to a display, aircraft data associated with an aircraft, the aircraft data including information of an aircraft position of the aircraft and an aircraft altitude of the aircraft.

A step 704 may include obtaining or generating, by the at least one processor, two-dimensional weather radar reflectivity data for a region proximate to the aircraft position, the two-dimensional weather radar reflectivity data including or based on at least one of horizontal weather radar scans or vertical weather radar scans.

A step 706 may include breaking down, by the at least one processor, the two-dimensional weather radar reflectivity data into cells, each cell of the cells having a maximum rainfall rate location and a geometric area (e.g., utilizing, by the at least one processor, image processing to break down the two-dimensional weather radar reflectivity data into cells, each cell of the cells having a maximum rainfall rate location and a geometric area).

A step 708 may include computing, by the at least one processor, storm top information of a given cell and information of a growth rate of the given cell for each cell of the cells from the two-dimensional weather radar reflectivity data.

A step 710 may include prioritizing, by the at least one processor, the cells based at least on at least one of each cell's proximity to the aircraft, each cell's intensity, each cell's growth rate, each cell's storm top altitude relative to the aircraft altitude, or a threat convective level of the cell to select a highest priority cell.

A step 712 may include outputting, by the at least one processor to the display, a highest priority azimuth slice vertical radar image of the two-dimensional weather radar reflectivity data as graphical data, the highest priority azimuth slice vertical radar image corresponding to an azimuth slice of the two-dimensional weather radar reflectivity data for the highest priority cell.

A step 714 may include displaying, by the display, the highest priority azimuth slice vertical radar image to a user.

Further, the method 700 may include any of the operations disclosed throughout.

As will be appreciated from the above, embodiments of the inventive concepts disclosed herein may be directed to a system (e.g., an aircraft system) and a method configured to select and display a prioritized (e.g., a highest priority) azimuth slice vertical radar image of a two-dimensional weather radar reflectivity data.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
a display; and
at least one processor communicatively coupled to the display, the at least one processor configured to:
obtain aircraft data associated with an aircraft, the aircraft data including information of an aircraft position of the aircraft and an aircraft altitude of the aircraft;
obtain or generate two-dimensional weather radar reflectivity data for a region proximate to the aircraft position, the two-dimensional weather radar reflectivity data including or based on at least one of horizontal weather radar scans or vertical weather radar scans;
break down the two-dimensional weather radar reflectivity data into cells, each cell of the cells having a maximum rainfall rate location and a geometric area;
compute storm top information of a given cell and information of a growth rate of the given cell for each cell of the cells from the two-dimensional weather radar reflectivity data;
prioritize the cells based at least on at least one of each cell's proximity to the aircraft, each cell's intensity, each cell's growth rate, each cell's storm top altitude relative to the aircraft altitude, or a threat convective level of the cell to select a highest priority cell; and
output, to the display, a highest priority azimuth slice vertical radar image of the two-dimensional weather radar reflectivity data as graphical data, the highest priority azimuth slice vertical radar image corresponding to an azimuth slice of the two-dimensional weather radar reflectivity data for the highest priority cell;
wherein the display is configured to display the highest priority azimuth slice vertical radar image to a user.

2. The system of claim 1, wherein the display is installed in the aircraft, wherein the at least one processor is installed in the aircraft.

3. The system of claim 1, wherein the at least one processor comprises at least one display unit computing device processor and at least one radar computing device processor, the at least one display unit computing device processor and the at least one radar computing device processor being communicatively coupled, wherein one or more of the at least one processor is configured to obtain the aircraft data from at least one aircraft computing device.

4. The system of claim 3, wherein the at least one display unit computing device processor comprises at least one horizontal display processor and at least one vertical display processor, wherein one or more of the at least one processor is configured to receive a user selection to display a horizontal weather radar image or the highest priority azimuth slice vertical radar image, wherein if the user selection is for the horizontal weather radar image, the at least one horizontal display processor is configured to display the horizontal weather radar image, wherein if the user selection is for the highest priority azimuth slice vertical radar image, the at least one vertical display processor is configured to display the highest priority azimuth slice vertical radar image.

5. The system of claim 4, wherein the user selection is for anything other than the highest priority azimuth slice vertical radar image, wherein the at least one radar computing device processor is configured to: determine that the highest priority azimuth slice vertical radar image is severe based at least on at least one of the highest priority cell being along a flight plan or the highest priority cell being within a predetermined distance of the flight plan or the aircraft position; and override the user selection to cause the at least one vertical display processor to output the highest priority azimuth slice vertical radar image.

6. The system of claim 1, wherein the user is located offboard of the aircraft.

7. The system of claim 1, wherein the aircraft data further includes information of a flight plan of the aircraft.

8. The system of claim 1, wherein the two-dimensional weather radar reflectivity data includes or is based on the horizontal weather radar scans and the vertical weather radar scans.

9. The system of claim 1, wherein the at least one processor is further configured to prioritize the cells based at least on each cell's proximity to the aircraft to select the highest priority cell.

10. The system of claim 9, wherein the at least one processor is further configured to prioritize the cells based at least on each cell's proximity to the aircraft and each cell's intensity to select the highest priority cell.

11. The system of claim 10, wherein the at least one processor is further configured to prioritize the cells based at least on each cell's proximity to the aircraft, each cell's intensity, and each cell's growth rate to select the highest priority cell.

12. The system of claim 11, wherein the at least one processor is further configured to prioritize the cells based at least on each cell's proximity to the aircraft, each cell's intensity, each cell's growth rate, each cell's storm top altitude relative to the aircraft altitude, and the threat convective level of the cell to select the highest priority cell.

13. The system of claim 1, wherein the at least one processor is further configured to obtain the two-dimensional weather radar reflectivity data from a source offboard of the aircraft.

14. The system of claim 1, wherein the at least one processor is further configured to prioritize the cells based at least on the at least one of each cell's proximity to the aircraft, each cell's intensity, each cell's growth rate, each cell's storm top altitude relative to the aircraft altitude, or the threat convective level of the cell to select, using hysteresis, the highest priority cell to ensure that a selection of the highest priority cell does not change for at least a predetermined amount of time.

15. A method, comprising:
obtaining, by at least one processor communicatively coupled to a display, aircraft data associated with an aircraft, the aircraft data including information of an aircraft position of the aircraft and an aircraft altitude of the aircraft;
obtaining or generating, by the at least one processor, two-dimensional weather radar reflectivity data for a region proximate to the aircraft position, the two-dimensional weather radar reflectivity data including or based on at least one of horizontal weather radar scans or vertical weather radar scans;

breaking down, by the at least one processor, the two-dimensional weather radar reflectivity data into cells, each cell of the cells having a maximum rainfall rate location and a geometric area;

computing, by the at least one processor, storm top information of a given cell and information of a growth rate of the given cell for each cell of the cells from the two-dimensional weather radar reflectivity data;

prioritizing, by the at least one processor, the cells based at least on at least one of each cell's proximity to the aircraft, each cell's intensity, each cell's growth rate, each cell's storm top altitude relative to the aircraft altitude, or a threat convective level of the cell to select a highest priority cell;

outputting, by the at least one processor to the display, a highest priority azimuth slice vertical radar image of the two-dimensional weather radar reflectivity data as graphical data, the highest priority azimuth slice vertical radar image corresponding to an azimuth slice of the two-dimensional weather radar reflectivity data for the highest priority cell; and displaying, by the display, the highest priority azimuth slice vertical radar image to a user.

* * * * *